April 9, 1929.  W. WRIGHT  1,708,645
TUBING SUPPORT
Filed July 20, 1927  2 Sheets-Sheet 1
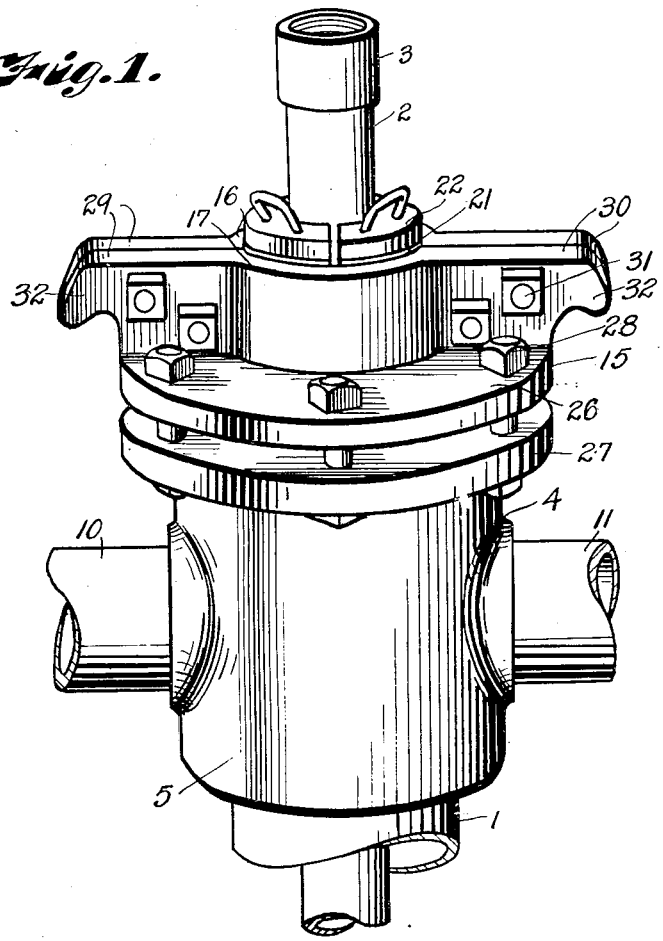
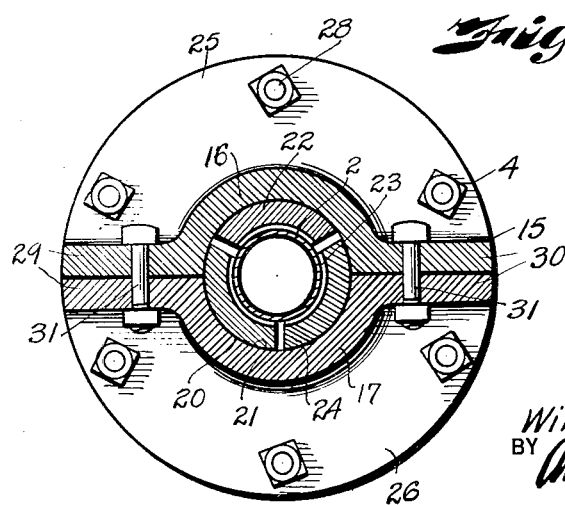
INVENTOR
William Wright
BY Arthur G. Bonn
ATTORNEY April 9, 1929. W. WRIGHT 1,708,645
TUBING SUPPORT
Filed July 20, 1927 2 Sheets-Sheet 2
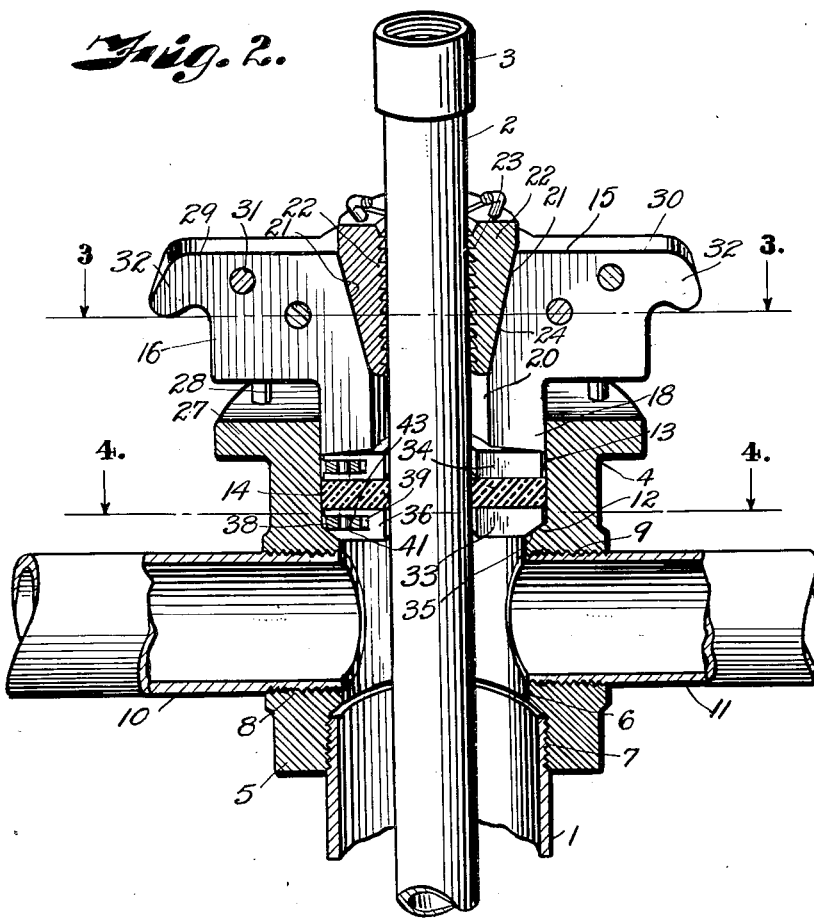
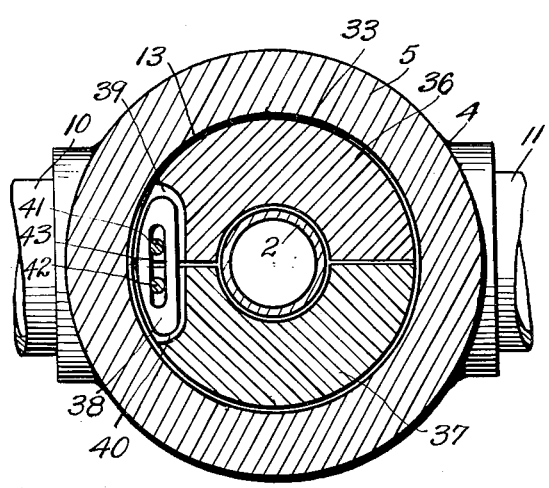
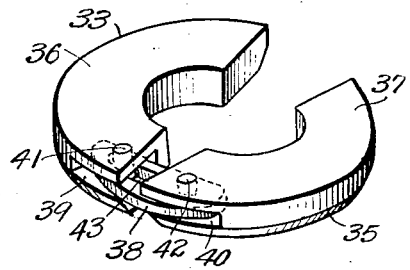
INVENTOR
William Wright
BY *[signature]*
ATTORNEY Patented Apr. 9, 1929.

1,708,645

UNITED STATES PATENT OFFICE.

WILLIAM WRIGHT, OF TULSA, OKLAHOMA, ASSIGNOR TO OKLAHOMA IRON WORKS, OF TULSA, OKLAHOMA, A CORPORATION OF OKLAHOMA.

TUBING SUPPORT.

Application filed July 20, 1927. Serial No. 207,192.

My invention relates to casing heads for oil wells and has for its principal object to provide a device of that character adapted for performing the usual functions of a casing head and which may, in addition thereto, serve as a tubing spider and, to a limited extent, as a tubing elevator.

In accomplishing these objects I have provided improved details of structure, the preferred forms of which are illustrated in the accompanying drawings, wherein:

Fig. 1 is a perspective view of a casing head embodying my improvements, illustrating its association with well casing and tubing.

Fig. 2 is a central longitudinal section through the device.

Fig. 3 is a section on the line 3—3, Fig. 2.

Fig. 4 is a section on the line 4—4, Fig. 2, showing the packing retainer rings and their pivotal link connection.

Fig. 5 is a detail perspective view of the lower packing retainer ring.

Referring in detail to the drawings:

1 designates the upper end of a well casing and 2 the upper end of tubing supported in the casing and provided with the usual coupling collar 3. The casing is capped by a casing or flow head 4 comprising a cylindrical body member 5 having the central, vertical opening 6 enlarged and screwthreaded at 7 to receive the casing. The flow head is also provided with opposite, threaded openings 8 and 9 intersecting the central opening 6 and receiving the flow line pipes 10.

The device so far described is of usual construction whereby oil flowed from the well by natural or artificial pressure, may be conducted from the head by the flow pipes 10 and 11; or whereby the said pipes 10 and 11 may be used for introducing an artificial pressure medium to the well for causing the oil to flow outwardly through the tubing.

12 designates a tapering seat formed by an enlargement 13 in the opening 6 above the flow pipe openings and adapted for supporting a packing element or oil saver 14. 15 designates generally a combination head cap, gland and tubing support, split longitudinally to form the mated halves 16 and 17 having a depending collar portion 18 slidable in said opening 13 to compress and retain the packing element or oil saver 14 against the shoulder 12 and in contact with the tubing.

The packing gland is provided with a central opening 20 and a tapered seat 21 constituting an upward extension of said opening 20 and adapted to receive slips 22 having inner serrated vertical faces 23 for engaging the tubing and outer tapering faces 24 for seating in the tapering seat 21. The mated halves of the packing gland are provided with flange sections 25 and 26, and the casing head is provided with a flange 27, whereby the gland may be secured to the casing head and compressed upon the packing element by the bolts 28 extending through suitable apertures in the said flanges.

Arms 29—29 and 30—30 integral with the upper collar and flange elements extend laterally on the halves of the packing gland from the collar element and are connected by bolts 31 extended through suitable apertures in said arms. Hooks 32 are provided on the outer ends of the arms 29 and 30 for engagement by bails of a hoisting apparatus (not shown).

The packing or oil saver element 14 above referred to comprises a split ring of rubber or similar resilient material and is retained between lower and upper supporting rings 33 and 34 (Fig. 5); the two metal rings being substantially identical in construction with the exception that the lower ring 33 is provided with the beveled lower edge 35, constituting a seating surface for engagement of the lower ring on the shoulder or seat 12 of the body member of the casing head. The rings are split for mounting upon the tubing, each ring comprising semi-circular mated halves 36 and 37, hingedly connected by a link 38 which is loosely mounted in similar registering recesses 39 and 40 in the meeting faces of the two semi-circular halves. Pins 41 and 42 are fixed in the halves of the ring and project through said recesses 39 and 40 and through a slot 43 provided in the link for slidable engagement of the link with the pins so that the two halves of the ring may be separated to the extent of the said slotted engagement of the link, and each half pivoted on its pin to spread the ends opposite the pivoting points, to permit removal of the ring from the tubing, or installation of the ring thereon.

The elements being assembled as described, with the casing head secured to the casing, tubing may be lowered into the casing through the head in the usual manner and while the tubing is then held suspended, the packing element 14 may be positioned in the opening of the casing head, the supporting ring 33 resting on the seat 12 and the packing ring 14 and retainer ring 34 installed thereupon.

The mated packing gland members may then be assembled around the tubing and secured together by the bolts 31, and the assembled structure lowered into the opening 13 of the casing head so that the lower end of the gland collar rests upon the upper ring 34 of the packing element. The bolts 28 may then be installed in the flanges 25 and 26 of the gland and flange 27 of the casing head and tightened to the extent desired to confer the requisite pressure by the gland on the packing to force the packing into sealing contact with the tubing. The slips 22 may then be inserted in the tapered seat 21 to grip and retain the tubing when the latter is released from the elevator.

When the tubing is to be pulled from the well, bails of a hoisting apparatus are applied to the hooks 32 and upon removal of the bolts connecting the flanges 25 and 26 with the flange 27, the hoisting apparatus may lift the cap member 15 and the tubing supported therein by the slips, sufficiently to permit the removal of the packing element and application of a standard elevator.

It is to be noted that the opening 20 in the gland or spider member is of sufficient diameter to permit passage of the tubing collars therethrough, and that when the device is employed as a spider, the flanges 25 and 26 of the cap member may rest upon the flange 27 of the body member.

What I claim and desire to secure by Letters Patent is:

A tubing support including, in combination with a casing head including a top flange and an interior packing seat, a cap including an annular flange mating with the casing head flange, a control collar having portions extending above and below the flange to provide slip seat and gland elements, and lateral arms integral with the flange and upper collar portion, and having bail hooks at their outer ends, the cap member being divided to permit mounting flange, collar and arm members, and means for securing said members together and to the casing head flange.

In testimony whereof I affix my signature.

WILLIAM WRIGHT.